INVENTORS
HAROLD K. FARR
PAUL O. FRELICH
RICHARD P. CURTIS
BY James and Franklin
ATTORNEYS

PROFILE OF BOTTOM

INVENTORS
HAROLD K. FARR
PAUL O. FRELICH
RICHARD P. CURTIS
BY James and Frankl
ATTORNEYS

United States Patent Office 3,296,579
Patented Jan. 3, 1967

3,296,579
CONTOUR MAP GENERATOR
Harold K. Farr, Westwood, Paul D. Frelich, Scituate, and Richard P. Curtis, Marblehead, Mass., assignors to General Instrument Corporation, Newark, N.J., a corporation of New Jersey
Filed July 17, 1964, Ser. No. 383,481
14 Claims. (Cl. 340—3)

This invention relates to a contour map generator, and more particularly to one which is responsive to a crossed fan-beam mapping system.

A copending patent application Serial No. 165,173, filed January 9, 1962, now Patent 3,144,631, by two of the present joint inventors and others, describes a radiation mapping system. The general object of the present invention is to make use of and to improve on the system there described. When the system is used on a ship to map an ocean bottom, as here described, the map may be referred to as a bathymetric chart. If the system were used on an aircraft to represent a land surface, the map would be a topographic chart.

The present specification describes the improvement with reference to a sonar system for producing a bathymetric chart or contour map. Different, but analogous techniques may be used with a radar system for producing a topographic chart.

As is described in the said application Serial No. 165,173, the sonar projector transmits a pulse of sound at intervals corresponding to the round trip travel time (or longer) from the surface to the bottom. For mapping down to a maximum depth of four thousand fathoms, this repetition period is chosen to be about twelve seconds (but may be lengthened for pitch null operation described later). The projector produces a fan-shaped beam of sound energy which is confined to a vertical plane perpendicular to the ship's long axis.

There are fan-shaped stabilized receiving beams which for a representative system are sixty-one in number, spaced at different angles on each side of the vertical at 1° intervals from 30° port to 30° starboard. On each transmission or "ping," the sound energy illuminates a long narrow strip of the bottom lying roughly perpendicular to the direction of the ship's track projected on the bottom. The sixty-one receiving beams resolve this illuminated strip into sixty-one elements whose centers may be referred to as target points.

A main object of the present invention is to so process and record data obtained from said mapping system as to directly produce a contour map, with the different elevations defined by conventional contour lines.

A further object is to allow for any angular difference between the ship's heading and the ship's course, and departure or displacement of the ship's actual track from the desired or theoretical course, as well as changes in speed.

Further objects of the invention are to allow for localized ship's motion, such as roll, pitch, and yaw, as well as variation in the velocity of sound with temperature and other bathymetric factors.

To accomplish the foregoing objects, and other more specific objects which will hereinafter appear, our invention resides in the contour map generator and the elements thereof and their relation one to another, as are hereinafter more particularly described in the following specification. The specification is accompanied by drawings in which.

Figure 1:
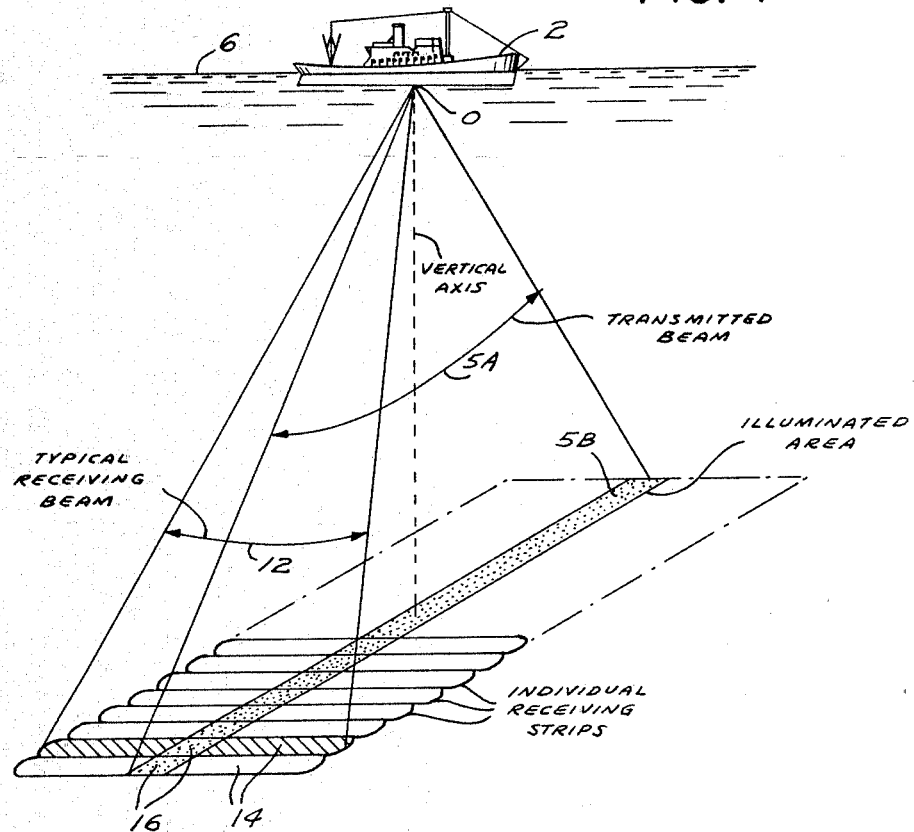
FIG. 1 is a perspective view explanatory of the mapping system of said prior application Serial No. 165,173.

In accordance with the invention disclosed in the aforesaid application Serial No. 165,173, and as shown in FIG. 1, the sonar energy emanating from ship 2 is transmitted in the form of a thin fan-beam 5A lying in a substantially vertical plane perpendicular to the heading of the ship. This beam is say 90° wide and approximately 1° thick, and illuminates a long narrow area of the sea bottom, as indicated at 5B, this area 5B extending perpendicular to the ship's heading. As the ship progresses, this illuminated strip 5B covers an area determined by the speed and direction of movement of the ship 2. To form the thin fan shaped transmitting beam, the transmitter may be composed of an array of transmitter elements arranged longitudinally on the hull.

For receiving transmitted radiations which are reflected from the sea bottom or other terrain being mapped, a plurality of individual fan-shaped receiving beams, one of which is designated 12, are employed. The planes of these beams are oriented substantially perpendicular to the transmitted beam 5A, that is to say, they are narrow (approximately 1°) widthwise of the ship, and are long (extending 7° to either side of the nominal vertical axis of the ship or a total of 14°) in the fore-and-aft direction of the ship. The beams 12 sight adjacent collateral areas 14 on the sea bottom, the areas 14 intersecting the area 5B at target points 16.

If a 60° scanning width is desired, sixty receiving beams 12 (or sixty-one with a vertical center beam), each of 1° width, are required. However, roll of the ship 2 would laterally translate the beams 12 and strips 14. To eliminate this disadvantage, the beams 12 collectively subtend at point O a lateral angle greater than 60°, say 90° (thus requiring the use of ninety receiving beams each 1° wide). This permits a roll of the ship 15° in either direction, while at the same time providing the desired number of receiving beams (e.g. 60) which are actually utilized at any one instant for mapping.

In our aforesaid application Serial No. 165,173, means are provided to select the proper sixty receiving beams 12 at any given moment, and to use the energy derived from those selected beams in the receiver circuitry. The receiver array may be located on the ship 2 in a band arranged laterally relative to the length of the ship, that is, athwartship around the bottom of the hull.

Because the length of the beams 12 (measured in the fore-and-aft direction of the ship 2) is greater than the corresponding dimension of the transmitted beam 5A, considerable longitudinal relative movement of the areas 14 is permissible without destroying their intersection with the area 5B. The apparatus may be arranged to compensate for pitch, or the ping may be transmitted only at intervals when the pitch is zero, or null.

In said application Serial No. 165,173, means are described for stabilizing the transmitted beam with respect to the pitching motion of the ship by "electronic steering," that is, by adjusting the electrical phase of the elements or transmitters in the projector array. An unsteered beam produced by driving all elements in phase is confined closely to a true plane. When the beam is steered, the maximum energy in the fan is along the elements of a shallow cone whose axis lies along the axis of the projecting array, that is, parallel to the ship's long axis. Steering the beam electronically results in varying the angle between an element of the cone and its axis. An unsteered beam represents the condition when this angle is 90° and the cone degenerates to a plane. Thus the beam can be steered so that one of the transmitted rays or cone elements is vertical, but the other rays depart slightly from the vertical plane. Beam steering improves the direction of radiation, but does not accomplish the objective perfectly.

In high seas, when pitch angles are large, the departure from the ideal vertical plane may lead to appreciable errors. In such case another mode of operation called the "Pitch Null" mode is employed. Instead of transmitting regularly, say at twelve-second intervals, the interval is increased beyond twelves seconds to an instant when the pitch angle is zero. By pinging at that instant, a transmitting beam is generated which most closely approaches a true vertical plane.

In either case, and for the purpose of designing the map generator, it therefore may be assumed that the transmited fan-beam is in a vertical plane.

If we assume a system of rectangular coordinates with the $x$ axis along the ship's long axis (assumed horizontal) at the instant of ping, the $y$ axis athwartship and horizontal, and the $z$ axis vertical downward, the coordinates of any one target point are:

(1)  $x=0$
     $y=r \sin \theta$
     $z=r \cos \theta$ in which $r$ is the slant range, and $\theta$ is the side-looking angle of the receiving beam, that is, the angle between the receiving beam and the vertical. Now (2)  $r=ct/2$ in which $t$ is the observed round trip travel time from transmission to the received echo, and $c$ is the velocity of sound. In practice, corrections to the above simple equations may be required because of the variation of $c$ with depth, bending of the sound rays, motion of the ship between transmission and reception, etc.

By computing the coordinates $y$ and $z$ for each of the 61 target points on any one transmission, and plotting them in the $yz$ plane, one obtains a vertical profile of the bottom, in the athwartship plane. On succeeding transmissions, additional profiles would be developed in planes spaced along the $x$ direction, so as to give a three-dimensional representation of the bottom.

The object of the present system is to present this information in the form of a contour map. This is accomplished by means of a recorder which, following each transmission, draws the portions of the contours (in practice only dots) corresponding to the athwartship strip of sea bottom illuminated. This is preferably done on a strip chart.

Figure 2:
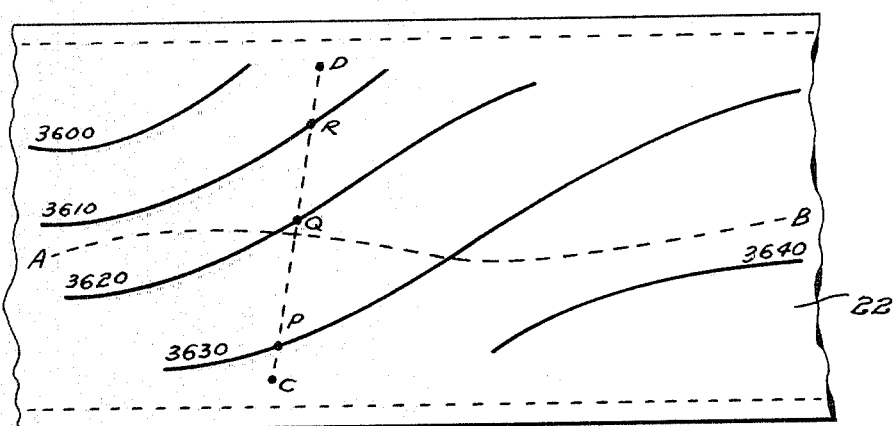
FIG. 2 shows a short piece of strip chart paper on which contour lines have been drawn.

FIG. 2 represents a contour map such as might be constructed after all the data from a large number of pings became available. The solid curves represent contour lines, that is lines of constant depth chosen at desired depth intervals, here indicated to be ten fathoms. The ship's track is along the dotted line A to B from left to right. The broken line CD is a typical "ping line," representing the strip of bottom illuminated by one transmission. Following the ping the recorder makes impressions or dots at the points P, Q and R where the ping line intersects the appropriate contour lines. Similar impressions are made on successive pings, the dots being displaced along the chart paper 22 from left to right. In this way, each contour line is developed as a series of dots, one dot on one line for each transmission.

Figure 3:
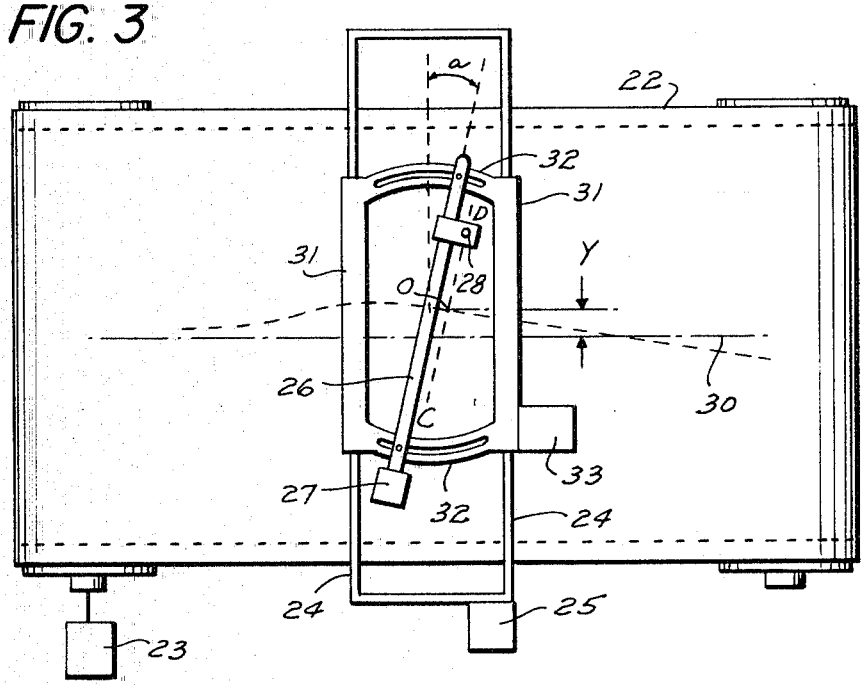
FIG. 3 is a schematic plan view explanatory of the recording device used to generate the desired contour lines.

The recorder, indicated schematically in FIG. 3, is of the strip chart type. The chart paper 22 is advanced each ping by an amount proportional to the component of the ship's motion along a specified desired track or reference track. The paper width is chosen to accommodate the map width. Thus, when mapping at a depth of four thousand fathoms (four miles) out to angles of $\theta = \pm 30°$ from the vertical, the map width would be $2 \times 4 \tan 30° = 4.61$ nautical miles. On a scale of 2" to the mile, this would require a chart width of $2 \times 4.61 = 9.22"$, plus an allowance for departure of ship's actual course from the desired track down the true center line of the chart paper.

The recording head assembly comprises a bar 26 and a stylus 28 movable along the bar. The head assembly is itself movable across the chart, as by slides 31 sliding on bars 24, and the angle of bar 26 may be changed, as suggested by arcuate mounts 32. The bars 24 and 26 are parallel to the plane of the paper 22, and crosswise of the long axis of the paper strip. The pen or stylus 28 moves parallel to the bar 26 and more specifically moves along the ping line CD. The bar 26 may be skewed at an angle $a$ from the direction perpendicular to the long axis of the paper. This may be done by means of a motor 33. The yaw angle $a$ is the angle between the vertical plane containing the ship's long axis at ping, and the vertical plane containing the desired ship's track. Provisions should be made at supports 32 for yaw angles of the order of $\pm 5°$ or even 10° to allow for the fact that the actual ping line may not be perpendicular to the long axis of the paper.

To allow for displacement of the ship's actual course from the specified theoretical reference track, the effective center O of the recording head or bar 26, representing the ship's position at ping, may be displaced laterally from the center line 30 of the chart 22, by some distance Y representing the lateral offset of the ship from the specified or ideal track. It is for this purpose that the assembly 26, 32 is slidable along bars 24. This may be done by means of a motor 25 driving a lead screw (or two parallel lead screws), not shown.

Figure 4:
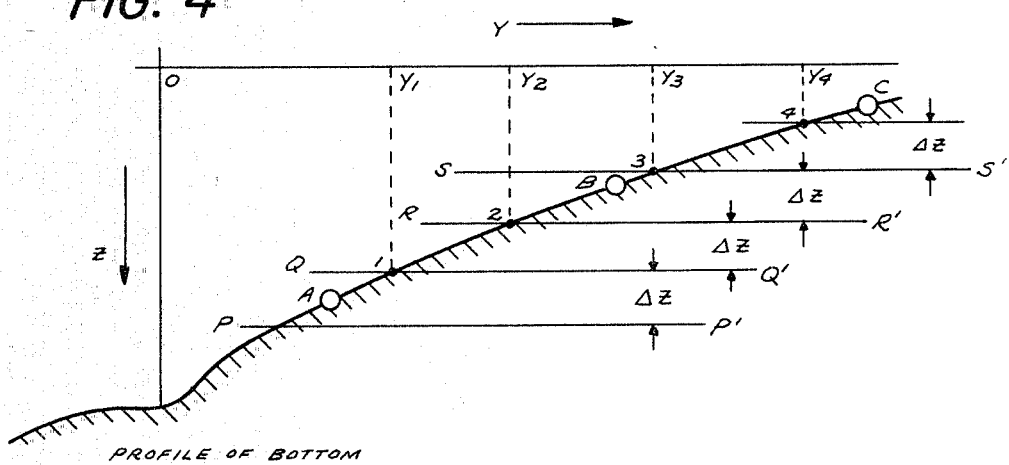
FIG. 4 is a fragmentary vertical section showing the profile of a bottom being mapped.

To describe the recording process more specifically, we can take one set of coordinates $(x, y, z)$ representing the target positions with respect to the ship as described above, and another set $(X, Y, Z)$ representing the ship's position with respect to the earth. In the latter coordinates, the X axis is taken down the center line 30 of the chart, along the specified desired track, and the Z axis is vertical. The chart drive is proportional to X. After each ping, the recording head 26 is repositioned by means of motors 25 and 33 responsive to the variables Y and $a$, respectively. The stylus or pin 28 then moves in the $y$ direction, under drive of a motor 27, marking contour elements at contour positions $y_1$, $y_2$, $y_3$, etc., as indicated in FIG. 4.

The recorder may use either ordinary pen and paper, or the so-called electrosensitive paper. For the former, the pen 28 is raised as it moves along the ping line, and is lowered only where a contour dot is to be recorded. With the latter, a stylus is moved along the surface of the paper, and a voltage is applied to the stylus wherever a contour dot is to be recorded.

It is clear that appropriate navigational information must be supplied for the quantities X, Y and $a$. This invention is not concerned with the source of that information, which may be supplied by known navigational instruments. The values $y_1$, $y_2$, and $y_3$ representing the contour positions along the ping line (line CD in FIGS. 2 and 3) are derived from the sonar information. There are sixty-one sonar echo times from one ping, and from these the contour positions $y_1$, $y_2$, $y_3$, etc., are computed. A brief description of how this is done is given in order to permit an understanding of the overall system. An appropriate digital computer is assumed to be available and is used as part of the system.

A digital clock counts time from the instant of ping. When an echo is received on a particular beam, the clock reading is stored in the core memory of the digital computer at an address corresponding to the particular beam, that is, to a particular value of the side-looking angle $\theta$. The calculations are then made in the computer. The core memory may be part of the computer, or it may be an auxiliary buffer memory.

Referring now to FIG. 4, the numerical operations are easily visualized. The target coordinates $y$ and $z$ for all sixty-one targets are computed, using Equations 1 and 2 plus necessary corrections. These are then examined in pairs. FIG. 4 shows two adjacent target points A and B. The assumption is made that the portion of the bottom profile between each two target points is a straight line. (More elaborate curve fitting procedures could be used if desired.) Using the specified contour interval $\Delta z$ (say $\Delta z = 10$ fathoms) contour levels are taken at those integral multiples of this interval which lie in the depth range of the two targets. In the case illustrated, there are two levels QQ' and RR' in this range. Their intersection with the profile AB gives points 1 and 2 whose $y$ coordinates are the required contour positions $y_1$ and $y_2$. The next interval, that between targets B and C, is then examined for further contours such as points 3 and 4 with coordinate positions $y_3$ and $y_4$. Any such interval may contain none or one or several such contour positions.

The result of the calculation is a number of $y$ values which are read out to the recorder. One means of making the digital-to-analog conversion required is to drive the pen or stylus with a lead screw having a conventional digital shaft encoder mounted on the drive shaft (here symbolized at 27 in FIG. 3). The encoder then would show the $y$ coordinate of the pen. The pen is driven at a uniform speed, and the reading of the shaft encoder is compared with the computed $y$ values in core storage. Whenever there is a match, the stylus is energized or the pen is lowered momentarily to make a dot.

The navigational inputs X, Y and $a$ may be applied as synchro orders for appropriate servomechanisms, or as digital inputs operating suitable digital-to-analog devices to drive the recorder. The X input moves the chart 22, by motive means here symbolized at 23 in FIG. 3. The Y input moves the bar 26 relative to bars 24, by motive means here symbolized at 25 in FIG. 3. The $a$ input orients the bar 26 relative to the supports 32 and bars 24, by motive means here symbolized at 33 in FIG. 3.

It is clear that the computation and plotting done for each cycle (say a twelve-second period) must be completed during the succeeding period, so that the next profile of the bottom can be processed as it becomes available.

Where very accurate processing is required, it may be necessary to supply the computer with additional data on the ship's localized motion such as roll, pitch and yaw, and on the variation of sound velocity. The latter is determined largely by temperature, and therefore may be determined from the so-called bathythermometric record. However, data on salinity also may be required, and there is a velocity variation with depth which may be compensated in accurate work.

In the "Pitch Null" mode the keyer for the transmitter is triggered by the closure of a cam-operated switch driven by the same pitch servo which is used to drive the phasing circuits for pitch stabilization of the transmitting beam. The switch is closed over some narrow range near zero pitch, such as $\pm 0.25°$. In this range the fan-beam is sufficiently close to a true vertical plane.

Figure 5:
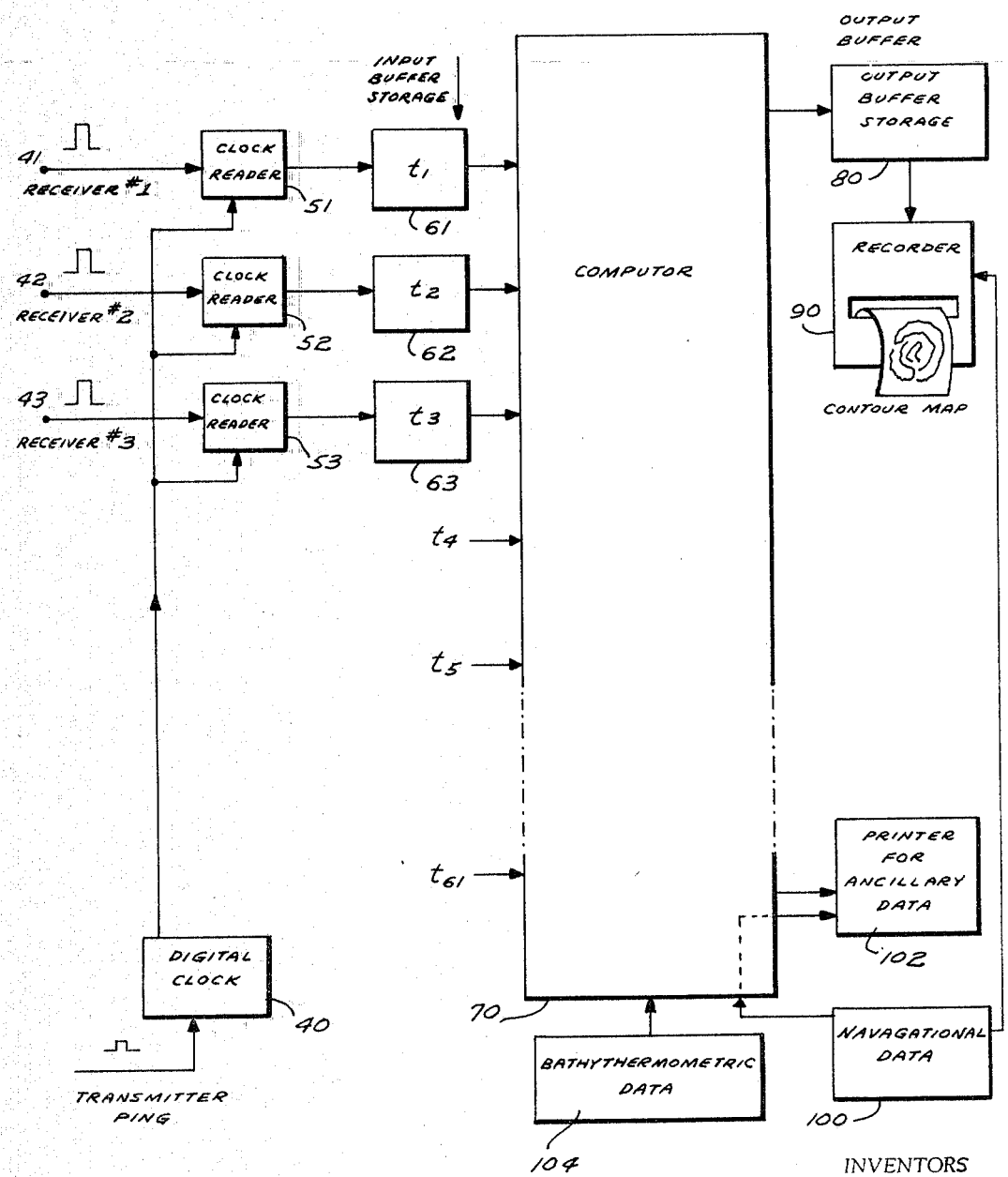
FIG. 5 is a block diagram explanatory of the apparatus employed in the present system.

Referring now to FIG. 5, a single high precision digital clock 40 serves for timing echoes from all sixty-one receivers, assumed connected at 41, 42, 43, etc. These receivers representing the various beam channels, each develop a single pulse representing an echo time $t_1$, $t_2$, $t_3$, etc. The digital clock 40 presents time measured from the transmitter ping in binary form. The receiver pulse triggers the clock reader 51, 52, 53, etc. and causes the time to be read into the corresponding buffer storage, indicated at 61, 62, 63, etc.

For each time $t$ the computer 70 calculates the corresponding spatial coordinates $y$ and $z$ (horizontal position and depth). That gives sixty pairs of points $(y_n, z_n)$. The computer 70 then compares successive pairs to see whether any contour lines pass between them. If there are any, the $y$ values of the contour positions are computed by linear interpolation and read into the output buffer storage, indicated at 80. The recorder stylus (28 in FIG. 3) moves at a uniform rate across the paper in the $y$ direction. The recorder is shown at 90 in FIG. 5. As the stylus moves, digital values of $y$ are read from a shaft encoder and are compared with the stored values. Whenever there is a match, the stylus is energized to print a dot. The values also are available for direct recording on magnetic tape, should that be desired as an additional record, or for later plotting.

Ship's speed goes directly into the recorder 90 in analog form from source 100, as paper speed. Alternatively, the chart advance may be operated from the computer to allow for a few seconds delay to process the sonar data and make the computations. Ship's heading relative to desired ground track (line 30 in FIG. 3) goes to the recorder as stylus bar tilt. Ship's displacement from desired ground track goes to the recorder as a Y value. Navigational data goes from source 100 to computer 70, as well as to recorder 90.

All necessary information may be printed out in alphanumerical form on a typewriter or printer forming a part of the computer 70 and here indicated at 102. This is synchronized with the map as follows: The map paper or chart strip is supplied with numbers printed along its margin and representing nautical miles from an arbitrary reference point. These numbers correspond with a printed grid. The sprocket drive for the paper carries a digital shaft encoder from which numbers are read onto the typewriter to key in any information with the map. This information includes the depth values of the contours being printed.

The contour calculation proceeds as follows: The first pair of points $(y_1, z_1)$ and $(y_2, z_2)$ are examined. Say $z$ values are $z_1 = 2732$, $z_2 = 2756$, and the contour interval is ten fathoms. A very simple program is devised for the computer to determine that contours $z' = 2740$ and $z'' = 2750$ lie in this interval.

To find the corresponding $y$ values by linear interpolation the following computation is performed:

$$a = (y_1 - y_2)/(z_1 - z_2)$$
$$b = (z_1 y_2 - z_2 y_1)/(z_1 - z_2)$$

Then the contour crossings $y'$ and $y''$ are found by computing $y = az + b$ with $z = z'$ and $z''$ respectively. The computer then examines the next two points $(y_2, z_2)$, $(y_3, z_3)$, and then the successive pairs of points.

Whenever it is necessary or desired to change the "velocity profile," that is, to correct for changes in sound velocity $c$ at different depths, the $y$ and $z$ functions must be recomputed for each beam. This will require time sharing the computer. Bathymetric data, particularly water temperature, may be supplied to computer 70 from source 104.

To summarize, the contour map is generated in a mapping vehicle moving over an area to be mapped, by transmitting a pulse of energy, receiving energy reflected from the surface or bottom to be mapped, and computing $y$ and $z$ coordinates defining a vertical profile of the area being mapped, the $y$ coordinates being transverse to the direction of travel of the vehicle, and the $z$ coordinates being depth coordinates from the horizontal plane of the vehicle. The map is printed by a recorder having a strip chart, and the chart is moved in proportion to the travel of the mapping vehicle, this being the $x$ coordinate. A recording stylus is moved repeatedly across the chart with a scanning motion, and prints a dot at any $y$ coordinate the $z$ coordinate of which corresponds to a predetermined contour line for the map.

Considered in somewhat greater detail, the method includes transmitting a pulse of energy (e.g. a sonar ping) in a beam which is narrow in the $x$ direction (the direction of travel), and which is wide in a $y$ direction transverse to the $x$ direction, and receiving such energy as is reflected from the intersections of the narrow area illuminated by said beam with a plurality of collateral adjacent receiving beams which are wide in the $x$ direction and narrow in the $y$ direction. The $y$ and $z$ coordinates define a vertical profile of the surface being mapped for each pulse transmission or ping. The recording stylus is given one scanning movement across the chart for each transmission or ping, and prints dots at the appropriate coordinates. This scanning and dot printing operation is repeated for each transmission or ping at a new $x$ coordinate located by movement of the chart, which is moved an amount corresponding to the travel of the vehicle between the successive pings.

As mentioned above, the computer may be used to perform the so-called ray bending calculations. These are the calculations required to trace the path of the sound rays from the projector to the bottom and back to the hydrophone. Because of the effect of temperature and pressure on sound velocity, the refractive index varies along the path of the ray and results in appreciable curvature of this path, which must be accounted for in accurate work. The problem is complicated by the motion of the ship and the change in the beam patterns resulting from the beam steering used to compensate for roll and pitch. One of the important functions of the computer is to perform these calculations.

It is believed that our improved contour mapping system as well as the advantages thereof, will be apparent from the foregoing detailed description. It will also be apparent that while we have shown and described our invention in a preferred form, changes may be made without departing from the scope of the invention, as sought to be defined in the following claims. In the claims the reference to generating the contour map in the mapping vehicle is not intended to exclude a delayed mapping described above, in which all of the necessary data or information bits are recorded on magnetic tape, and from which tape the recorder may be operated later, with the same result as when the recorder is carried by and operated in the vehicle. Also, the letters $x$, $y$, and $z$ are used merely for convenience, and other letters could be used for the coordinates, or the same three letters could be interchanged and used for other of the three coordinates.

We claim:

1. Apparatus for generating a contour map in a mapping vehicle moving over an area to be mapped, said apparatus comprising means to transmit pulses of energy in a beam which is narrow in an $x$ direction which is approximately the direction of travel of the vehicle, and which is wide in a $y$ direction transverse to the $x$ direction, means to receive energy reflected from the intersections of the narrow area illuminated by said beam with a plurality of collateral adjacent receiving beams which are wide in the $x$ direction and narrow in the $y$ direction, a computer responsive to the received energy for computing $y$ and $z$ coordinates defining a vertical profile of the area being mapped, the $z$ coordinates being depth coordinates from the horizontal plane of the vehicle, a recording device having means to move a recording chart in proportion to the travel of the mapping vehicle, and having means to move a recording stylus repeatedly across the chart, the stylus of said recorder being responsive to an output of said computer for printing a dot at any $y$ coordinate the $z$ coordinate of which corresponds to a predetermined contour line for the map, the scanning travel and dot printing operation of the stylus being related to the travel of the vehicle by movement of the chart.

2. Apparatus as defined in claim 1 in which the means to move the stylus across the chart for plotting coordinate $y$ may be bodily moved across the chart, and in which there is a mechanism to move the same, and in which said mechanism receives and is responsive to navigational data showing the displacement Y of the actual track of the vehicle from its desired track.

3. Apparatus as defined in claim 1, in which the means to move the stylus across the chart may be varied in angular relation to the axes of the chart, and in which there is mechanism to vary the angular relation, and in which said mechanism receives and is responsive to navigational data showing the difference between the heading of the vehicle and the direction of the desired course.

4. Apparatus as defined in claim 1, in which the means to move the stylus across the chart for plotting coordinate $y$ may be bodily moved across the chart, and in which there is a mechanism to move the same, and in which the means to move the stylus across the chart may be varied in angular relation to the axes of the chart, and in which there is mechanism to vary the angular relation, and in which the said mechanisms receive and are responsive to navigational data showing the displacement Y of the actual course from the desired course and showing the difference between the heading of the vehicle and the direction of the desired course.

5. Apparatus for generating a contour map in a mapping vehicle moving over an area to be mapped, said apparatus comprising means to transmit a pulse of energy in a beam which is narrow in an $x$ direction which is approximately the direction of travel of the vehicle, and which is wide in a $y$ direction transverse to the $x$ direction, means to receive energy reflected from the intersections of the narrow area illuminated by said beam with a plurality of collateral adjacent receiving beams which are wide in the $x$ direction and narrow in the $y$ direction, a computer responsive to the received energy for computing $y$ and $z$ coordinates defining a vertical profile of the area being mapped for each transmission, the $z$ coordinates being depth coordinates from the horizontal plane of the vehicle, a recording device having means to move a recording chart in proportion to the travel of the mapping vehicle, and having means to move a recording stylus across the chart for each pulse transmission, the stylus of said recorder being responsive to an output of said computer for printing a dot at any $y$ coordinate the $z$ coordinate of which corresponds to a predetermined contour line for the map, the scanning travel and dot printing operation of the stylus being repeated for each successive pulse transmission at a new $x$ coordinate located by movement of the chart an amount corresponding to the travel of the vehicle between the successive pulse transmissions.

6. Apparatus for generating a bathymetric contour map in a ship moving over a bottom area to be mapped, said apparatus comprising sonar means to transmit a sonar ping in a beam which is narrow in an $x$ direction which is approximately the direction of travel of the ship, and which is wide in a $y$ direction transverse to the $x$ direction, means to receive energy reflected from the intersections of the narrow area illuminated by said beam with a plurality of collateral adjacent receiving beams which are wide in the $x$ direction and narrow in the $y$ direction, a computer responsive to the received energy for computing $y$ and $z$ coordinates defining a vertical profile of the bottom being mapped for each ping, the $z$ coordinates being depth coordinates from the ship, a recording device having means to move a recording chart in proportion to the travel of the ship, and having means to move a recording stylus across the chart for each ping, the stylus of said recorder being responsive to an output of said computer for printing a dot at any $y$ coordinate the $z$ coordinate of which corresponds to a predetermined contour line for the map, the scanning travel and dot printing operation of the stylus being repeated for each successive ping at a new $x$ coordinate located by movement of the chart an amount corresponding to the travel of the ship between the successive pings.

7. Apparatus as defined in claim 6 in which the means to move the stylus across the chart for plotting coordinate $y$ may be bodily moved across the chart, and in which there is a mechanism to move the same, and in which said mechanism receives and is responsive to navigational data showing the displacement $Y$ of the actual course of the ship from its desired course.

8. Apparatus as defined in claim 6, in which the means to move the stylus across the chart may be varied in angular relation to the axes of the chart, and in which there is mechanism to vary the angular relation, and in which said mechanism receives and is responsive to navigational data showing the difference between the heading of the ship and the direction of the desired course.

9. Apparatus as defined in claim 6, in which the means to move the stylus across the chart for plotting coordinate $y$ may be bodily moved across the chart, and in which there is a mechanism to move the same, and in which the means to move the stylus across the chart may be varied in angular relation to the axes of the chart, and in which there is mechanism to vary the angular relation, and in which the said mechanisms receive and are responsive to navigational data showing the displacement $Y$ of the actual course of the ship from the desired course and showing the difference between the heading of the ship and the direction of the desired course.

10. The method of generating a contour map in a mapping vehicle moving over an area to be mapped, which includes transmitting pulses of energy in a beam which is narrow in an $x$ direction which is approximately the direction of travel of the vehicle, and which is wide in a $y$ direction transverse to the $x$ direction, receiving energy reflected from the intersections of the narrow area illuminated by said beams with a plurality of collateral adjacent receiving beams which are wide in the $x$ direction and narrow in the $y$ direction, computing $y$ and $z$ coordinates defining a vertical profile of the area being mapped, the $z$ coordinates being depth coordinates from the horizontal plane of the vehicle, moving a recording chart in proportion to the travel of the mapping vehicle, moving a recording stylus repeatedly across the chart, and printing a dot at any $y$ coordinate the $z$ coordinate of which corresponds to a predetermined contour line for the map.

11. The method of generating a contour map in a mapping vehicle moving over an area to be mapped, which includes transmitting a pulse of energy in a beam which is narrow in an $x$ direction which is approximately the direction of travel of the vehicle, and which is wide in a $y$ direction transverse to the $x$ direction, receiving energy reflected from the intersections of the narrow area illuminated by said beam with a plurality of collateral adjacent receiving beams which are wide in the $x$ direction and narrow in the $y$ direction, computing $y$ and $z$ coordinates defining a vertical profile of the area being mapped for each pulse transmission, the $z$ coordinates being depth coordinates from the horizontal plane of the vehicle, moving a recording chart in proportion to the travel of the mapping vehicle, moving a recording stylus across the chart for each pulse transmission, printing a dot at any $y$ coordinate the $z$ coordinate of which corresponds to a predetermined contour line for the map, and repeating this for each successive pulse transmission at a new $x$ coordinate located by movement of the chart an amount corresponding to the travel of the vehicle between the successive pulse transmissions.

12. Apparatus for generating a contour map in a mapping vehicle moving over an area to be mapped, said apparatus comprising means to transmit pulses of energy, means to receive energy reflected from said area, a computer responsive to the received energy for computing $y$ and $z$ coordinates defining a vertical profile of the area being mapped, the $y$ coordinates being transverse to the direction of travel of the vehicle, the $z$ coordinates being depth coordinates from the horizontal plane of the vehicle, a recording device having means to move a recording chart in proportion to the travel of the mapping vehicle, and having means to move a recording stylus repeatedly across the chart, the stylus of said recorder being responsive to an output of said computer for printing a dot at any $y$ coordinate the $z$ coordinate of which corresponds to a predetermined contour line for the map, the scanning travel and dot printing operation of the stylus being related to the travel of the vehicle by movement of the chart, the aforesaid means to move the stylus across the chart for plotting the $y$ coordinate being itself mounted for bodily movement across the chart, and mechanism to bodily move the said means, said mechanism receiving and being responsive to navigational data showing the displacement $Y$ of the actual track of the vehicle from its desired track.

13. Apparatus for generating a contour map in a mapping vehicle moving over an area to be mapped, said apparatus comprising means to transmit pulses of energy, means to receive energy reflected from said area, a computer responsive to the received energy for computing $y$ and $z$ coordinates defining a vertical profile of the area being mapped, the $y$ coordinates being transverse to the direction of travel of the vehicle, the $z$ coordinates being depth coordinates from the horizontal plane of the vehicle, a recording device having means to move a recording chart in proportion to the travel of the mapping vehicle, and having means to move a recording stylus repeatedly across the chart, the stylus of said recorder being responsive to an output of said computer for printing a dot at any $y$ coordinate the $z$ coordinate of which corresponds to a predetermined contour line for the map, the scanning travel and dot printing operation of the stylus being related to the travel of the vehicle by movement of the chart, the aforesaid means to move the stylus across the chart for plotting the $y$ coordinate being so mounted that it may be varied in angular relation to the axes of the chart, and mechanism to vary the said angular relation, said mechanism receiving and being responsive to navigational data showing the difference between the heading of the vehicle and the direction of the desired course.

14. Apparatus for generating a contour map in a mapping vehicle moving over an area to be mapped, said apparatus comprising means to transmit pulses of energy, means to receive energy reflected from said area, a computer responsive to the received energy for computing $y$ and $z$ coordinates defining a vertical profile of the area being mapped, the $y$ coordinates being transverse to the direction of travel of the vehicle, the $z$ coordinates being depth coordinates from the horizontal plane of the vehicle, a recording device having means to move a recording chart in proportion to the travel of the mapping vehicle, and having means to move a recording stylus repeatedly across the chart, the stylus of said recorder being responsive to an output of said computer for printing a dot at any $y$ coordinate the $z$ coordinate of which corresponds to a predetermined contour line for the map, the scanning travel and dot printing operation of the stylus being related to the travel of the vehicle by movement of the chart, the aforesaid means to move the stylus across the chart for plotting the y coordinate being itself mounted for bodily movement across the chart, and being so mounted that it may be varied in angular relation to the axes of the chart, mechanism to bodily move the said means across the chart, and mechanism to vary the said angular relation, said mechanisms receiving and being responsive to navigational data showing the displacement y of the actual course from the desired course and showing the difference between the heading of the vehicle and the direction of the desired course.

References Cited by the Examiner

UNITED STATES PATENTS

| | | | |
|---|---|---|---|
| 2,648,838 | 8/1953 | Raymond | 343—11 |
| 2,940,074 | 6/1960 | Watt | 343—11 |
| 2,966,655 | 12/1960 | Thiede | 340—3 |
| 3,005,973 | 10/1961 | Kietz | 340—3 |
| 3,007,155 | 10/1961 | Petrides et al. | 343—6 |
| 3,191,170 | 6/1965 | Lustig et al. | 343—5 |

CHESTER L. JUSTUS, *Primary Examiner.*

R. A. FARLEY, *Assistant Examiner.*